(12) United States Patent
Lisart et al.

(10) Patent No.: US 8,809,858 B2
(45) Date of Patent: Aug. 19, 2014

(54) DEVICE FOR PROTECTING AN INTEGRATED CIRCUIT AGAINST BACK SIDE ATTACKS

(71) Applicant: STMicroelectronics (Rousset) SAS, Rousset (FR)

(72) Inventors: Mathieu Lisart, Aix en Provence (FR); Thierry Soudé, Pourrieres (FR); Alexandre Sarafianos, Marseilles (FR); Francesco La Rosa, Rousset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 13/750,790

(22) Filed: Jan. 25, 2013

(65) Prior Publication Data

US 2013/0193437 A1    Aug. 1, 2013

(30) Foreign Application Priority Data

Jan. 27, 2012   (FR) ...................................... 12 50787

(51) Int. Cl.
*H01L 29/40* (2006.01)
(52) U.S. Cl.
USPC ................. 257/47; 257/48; 257/724; 438/14; 438/18

(58) Field of Classification Search
CPC ................................ H01L 22/20; H01L 22/32
USPC ............................................... 257/48; 438/14
See application file for complete search history.

(56) References Cited

U.S. PATENT DOCUMENTS

| 6,049,117 | A  | * | 4/2000 | Fukunaga et al. | ............ 257/446 |
| 6,342,401 | B1 |   | 1/2002 | Tom | |
| 8,564,364 | B2 | * | 10/2013 | Marinet et al. | ................ 327/565 |
| 2005/0029653 | A1 | | 2/2005 | Aumuller et al. | |
| 2009/0251168 | A1 | | 10/2009 | Lisart et al. | |
| 2010/0187527 | A1 | | 7/2010 | Van Geloven et al. | |
| 2010/0315108 | A1 | | 12/2010 | Fornara et al. | |
| 2012/0223309 | A1 | | 9/2012 | Mowry et al. | |

FOREIGN PATENT DOCUMENTS

DE           10204875 C1     2/2003

* cited by examiner

*Primary Examiner* — Dung A. Le
(74) *Attorney, Agent, or Firm* — Seed IP Law Group PLLC

(57) ABSTRACT

An integrated circuit including: a semiconductor substrate of a first conductivity type having at least one well of a second conductivity type laterally delimited, on two opposite walls, by regions of the first conductivity type, defined at its surface; at least one region of the second conductivity type which extends in the semiconductor substrate under the well; and a system for detecting a variation of the substrate resistance between each association of two adjacent regions of the first conductivity type.

15 Claims, 3 Drawing Sheets

DEVICE FOR PROTECTING AN INTEGRATED CIRCUIT AGAINST BACK SIDE ATTACKS

BACKGROUND

1. Technical Field

The present disclosure relates to a device for protecting an integrated circuit against external attacks and, in particular, against attacks performed from the back side of the integrated circuit.

2. Description of the Related Art

It may be desirable to protect an integrated circuit against external attacks which aim, for example, at determining the integrated circuit structure and operation, at accessing confidential data stored in the integrated circuit, or again at disturbing the circuit operation. An example of attack comprises partially etching the insulating layers from the front surface of the integrated circuit to access metal tracks of the last metallization levels, and creating metal pads connected to these tracks to measure the signals which transit therethrough.

The integrated circuit may comprise a protection device which enables to detect that an attack is being carried out and which can then control the stopping of the integrated circuit, or the deleting of confidential data.

An example of a device of protection against attacks performed on the front side of the integrated circuit uses metal tracks of the last metallization levels of the integrated circuit, which cover the metal tracks transmitting "useful" signals. A detection device is capable of detecting a rupture of these tracks, which corresponds to an attack. However, this protection device is ineffective against attacks on the back side of the integrated circuit.

BRIEF SUMMARY

An embodiment provides a relatively simple device for protecting an integrated circuit against back side attacks.

Another embodiment provides such a device compatible with other known attack detection devices.

Thus, an embodiment provides an integrated circuit comprising: a semiconductor substrate of a first conductivity type having at least one well of a second conductivity type laterally delimited, on two opposite walls, by regions of the first conductivity type, defined at its surface; at least one region of the second conductivity type which extends in the semiconductor substrate under the well; and a system for detecting a variation of the resistance of the substrate between each association of two adjacent regions of the first conductivity type.

According to an embodiment, the detection system comprises a generator of at least one potential difference applied between the two adjacent regions of the first conductivity type and a system for comparing with a threshold the current flowing between the two adjacent regions of the first conductivity type.

According to an embodiment, the circuit comprises at least two wells of a second conductivity type laterally delimited, on two opposite walls, by regions of the first conductivity type, one of the regions of the first conductivity type being common to the two wells, the generator applying a first potential difference between the common region of the first conductivity type and a first region of the first conductivity type and a second potential difference between the common region of the first conductivity type and a second region of the first conductivity type.

According to an embodiment, the first potential difference and the second potential difference are equal.

According to an embodiment, the system for comparing with a threshold the current flowing between the two adjacent regions of the first conductivity type comprises: between two terminals of application of a power supply voltage, a first branch comprising a first transistor in series with the resistor, the variation of which is desired to be detected, and a second branch comprising a second transistor in series with a generator of a reference current; an operational amplifier having an input terminal connected to the junction point of the first transistor and of the resistor, having a second input terminal connected to a reference voltage, and having its output controlling the first and second transistors.

According to an embodiment, the circuit further comprises heavily-doped areas of the first conductivity type formed at the surface of the regions of the first conductivity type.

According to an embodiment, the circuit further comprises a system for protecting the integrated circuit if a variation of the resistance of the substrate between two strongly resistive regions is detected.

According to an embodiment, the first conductivity type is type P and the second conductivity type is type N.

According to an embodiment, the semiconductor substrate is a solid substrate.

According to an embodiment, the semiconductor substrate is formed of an epitaxial layer of a semiconductor material on a semiconductor support.

The present disclosure describes an integrated circuit comprising a semiconductor substrate of a first conductivity type having a surface; a first well of a second conductivity type formed in the substrate and having first and second sides; first and second regions of the first conductivity type defined at the surface of the substrate and respectively delimiting the first and second sides of the first well; a region of the second conductivity type which extends in the semiconductor substrate under said first well; and a detector configured to detect a variation of a resistance of the substrate between the first and second regions of the first conductivity type. The detector comprises a voltage generator circuit configured to generate a first potential difference between said first and second regions and cause a current to flow between said first and second regions; and a comparison circuit configured to compare the current between said first and second regions and a threshold. The circuit comprises a second well of the second conductivity type formed in the substrate and having first and second sides; and a third region of the first conductivity type, the second and third regions respectively delimiting the first and second sides of the second well, and the generator circuit being configured to apply a second potential difference between the second region and the third region.

The foregoing and other features and advantages will be discussed in detail in the following non-limiting description of specific embodiments in connection with the accompanying drawings.

BRIEF DESCRIPTION OF THE SEVERAL VIEWS OF THE DRAWINGS

For clarity, the same elements have been designated with the same reference numerals in the different drawings and, further, as usual in the representation of integrated circuits, the various drawings are not to scale.

DETAILED DESCRIPTION

Figure 1:
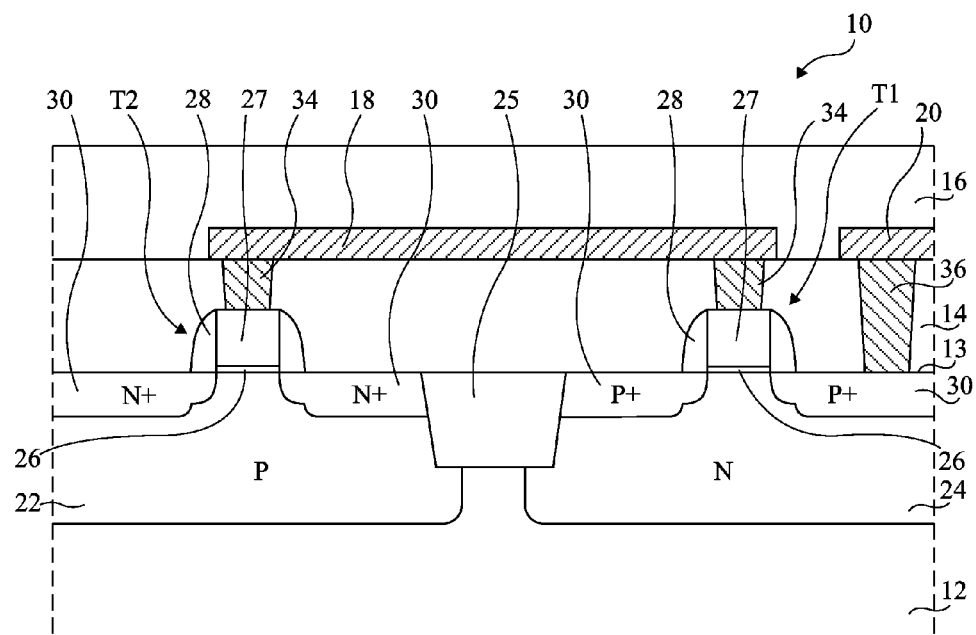
FIGS. 1 and 2 illustrate an example of attack on the back side of an integrated circuit.
Figure 2:
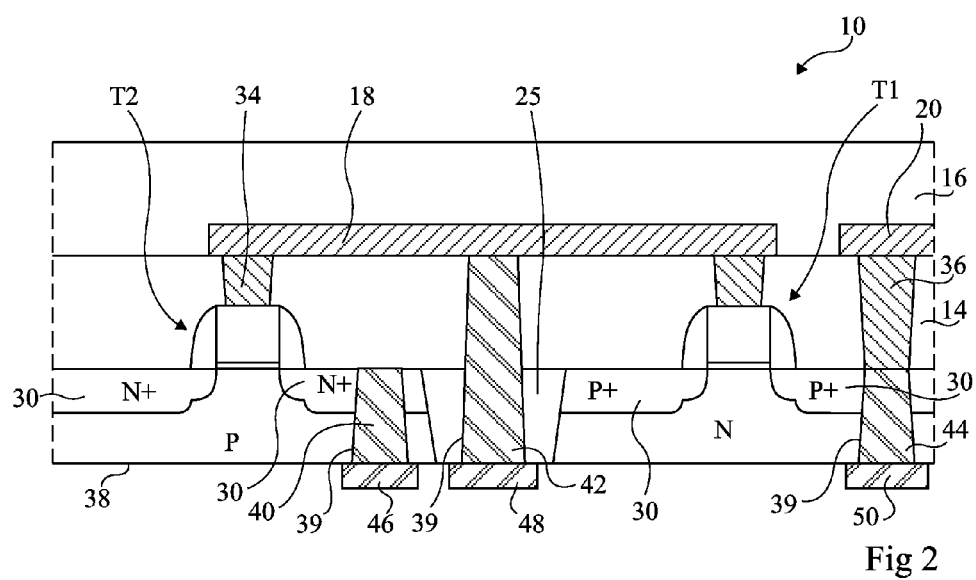

FIGS. 1 and 2 illustrate an example of attack of an integrated circuit 10 on the back side.

FIG. 1 is a simplified cross-section view of an example of a conventional integrated circuit. Integrated circuit 10 comprises a substrate 12 made of a semiconductor material and having a surface 13 covered with a stack of insulating layers 14, 16 (only two insulating layers are shown in FIGS. 1 and 2). Metal tracks 18, 20 are formed between insulating layers 14 and 16.

In substrate 12 are formed a P-type doped region 22 and an N-type doped region 24 which extend from surface 13. Regions 22 and 24 form wells which are laterally separated from one another by an insulating region 25 formed in substrate 12, for example, according to a shallow trench insulation method (STI).

As an example, a P-channel transistor T1 at the level of well 24 and an N-channel transistor T2 at the level of well 22 have been shown. Conventionally, each transistor T1, T2 comprises an insulating portion 26 covering substrate 12 and forming the gate insulator of transistor T1, T2, topped with a portion 27 of a semiconductor material forming the gate of transistor T1, T2. Spacers 28 surround gate 27 and doped regions 30 are arranged on either side of gate 27 in the corresponding well to form the source and drain regions of transistor T1, T2.

As an example, metal track 18 is connected to gates 27 by conductive vias 34 crossing insulating layer 14, and metal track 20 is connected to drain or source region 30 of transistor T1 by a conductive via 36 crossing insulating layer 14.

FIG. 2 is a cross-section view similar to FIG. 1 after circuit 10 has been attacked on its back side. Such an attack comprises locally etching substrate 12 from the back side of circuit 10. The local etching of substrate 12 may comprise defining in substrate 12, from the back side, increasingly deep and narrow successive openings, the last openings being formed by means of a focused ion beam (FIB).

Once the bottom 38 of the last opening is level with insulating region 25, openings 39 are formed in substrate 12 and/or in insulating layer 14. Openings 39 are then filled with a conductive material to form vias 40, 42, 44. Contact pads 46, 48, 50 are then formed on bottom 38, each contact pad covering one of vias 40, 42, 44. As an example, via 40 connects pad 46 to a drain or source region 30 of transistor T2, via 42 connects pad 48 to metal track 18, and via 44 connects pad 50 to via 36. The described attack thus enables to access signals present in active areas of the integrated circuit and/or at the level of tracks of the first metallization level of the integrated circuit.

An example of a protection device which aims at preventing attacks on the back side of an integrated circuit comprises a package encapsulating the integrated circuit and associated with a circuit for detecting an unwanted opening of the package. However, such a protection device is particularly bulky and has a high manufacturing cost.

To detect the implementation of attacks on the back side of a circuit, it is provided to define, under the active areas of an integrated circuit, a path having a resistance which is measured, a variation of this resistance meaning an etching of the back side and thus an attack on the circuit.

Figure 3:
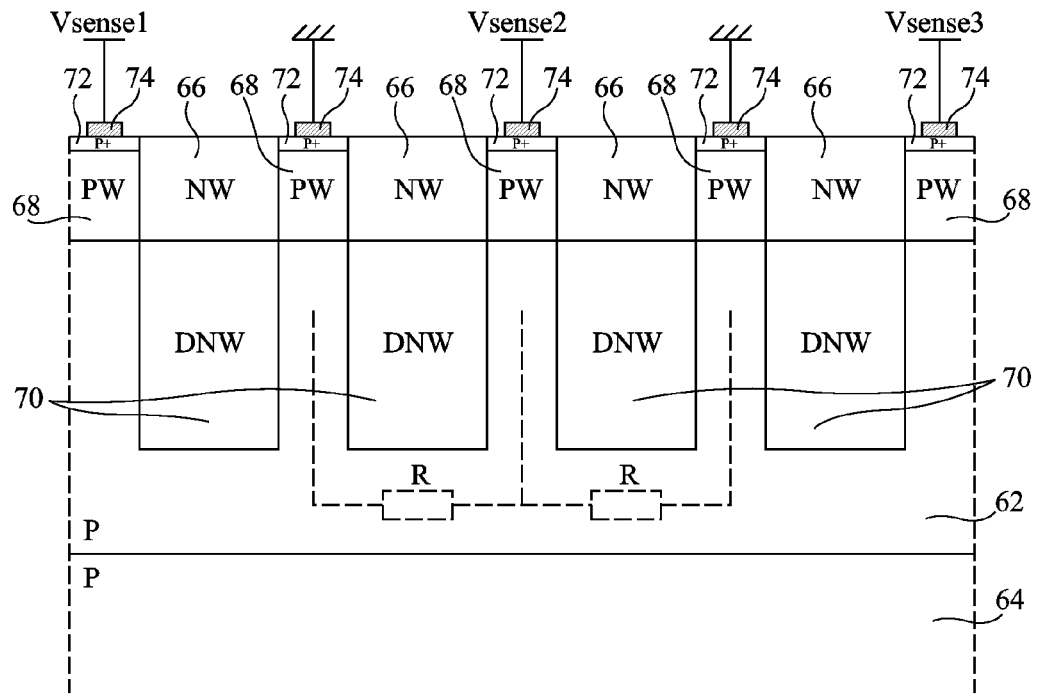
FIGS. 3 and 4 respectively are a simplified cross-section view and bottom view of an example of an integrated circuit provided with a protection device.
Figure 4:
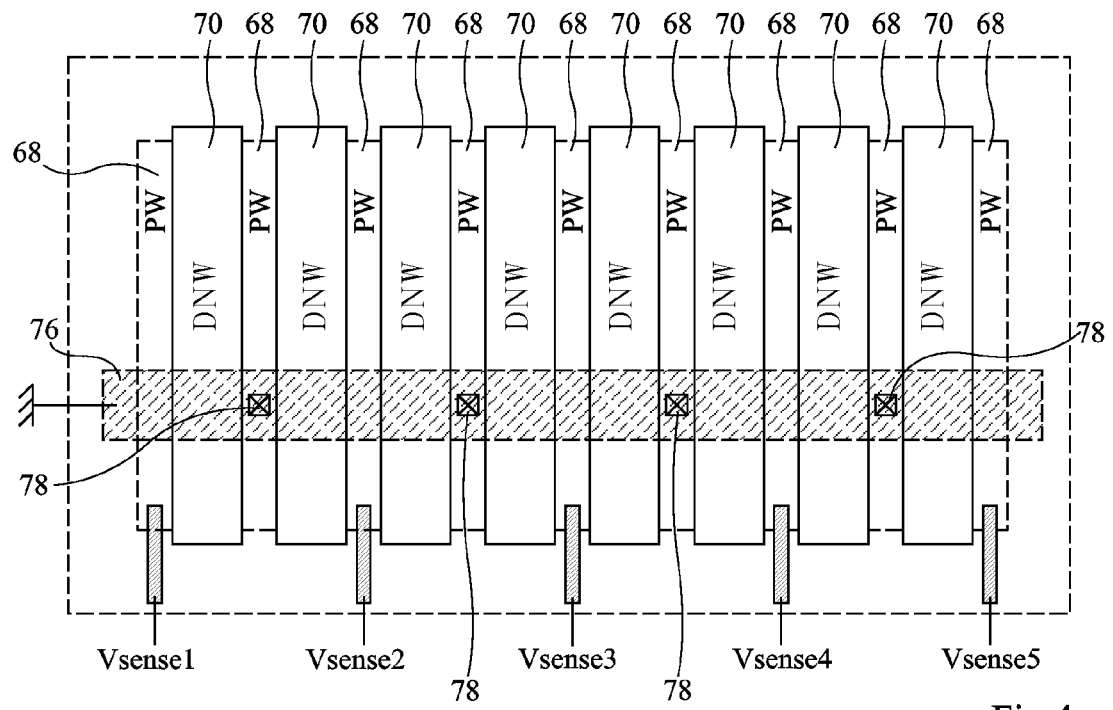

FIGS. 3 and 4 respectively are a simplified cross-section view and bottom view of an embodiment of an integrated circuit 60 provided with a protection device according to an embodiment.

The device comprises a semiconductor substrate 62 where active areas are formed. In the shown example, substrate 62 is an epitaxial layer on a semiconductor support 64. It should be noted that as a variation, substrate 62 may be a low-resistance solid substrate, with no upper epitaxial layer. In the shown example, substrate 62 and support 64 are P-type doped. As an example of numerical application, substrate 62 and support 64 may be doped at a dopant concentration such that their resistivity is on the order of 10 Ω·cm, for example ranging between 8 and 12 Ω·cm.

In an upper portion of substrate 62 are formed N-type doped semiconductor wells 66 (NW) which form active areas of the circuit in which the electronic components are formed. Active areas 66 are separated by P-type doped trenches 68 (PW), which enable to insulate the active areas from one another. As will be seen hereafter, regions 68 also take part in the detection of back side attacks. As an example of numerical application, trenches 68 may be doped at a dopant concentration such that their resistivities are on the order of 0.1 Ω·cm, for example, ranging between 0.08 and 0.12 Ω·cm.

Trenches 68 penetrate into the substrate down to a depth similar or equal to that of active areas 66. Under each active area 66 is formed a doped region 70 (DNW) of the same conductivity type as the active area, less heavily doped than active area 66.

The dopant concentrations of regions 66 and 70 may be close to each other. As an example, the resistivity of region 70 may be on the order of twice the resistivity of region 68.

To form regions 66 and 70 of the structure of FIGS. 3 and 4, one may:

perform a first dopant implantation at a first power and with a first dopant concentration to form regions 66, and then
perform a second dopant implantation with a second power and a second dopant concentration to form regions 70.

In this case, the second implantation power is greater than the first one, and the second dopant concentration is smaller than the first one.

As better shown in the bottom view of FIG. 4, active areas 66 and N-type doped regions 70 extend at the surface of the substrate in separate strips, which are parallel in the shown example. As an example, the strips have a length ranging between 0.5 and 1.5 mm, for example, a 1-mm length. PW regions 68 form strips parallel to strips 66/70 and having a length similar or equal to 66/70.

At the surface of trenches 68, and between two active areas 66, P+ regions 72 of small thickness and heavily doped with the same conductivity type as trenches 68 may be provided. Regions 72 ensure an improved electric contact on trenches 68. Contact pads 74 of a conductive material may be formed on regions 72 to apply a voltage on underlying regions 68. It should be noted that pads 74 are in practice formed of conductive vias formed in an interconnection stack which extends at the surface of the device.

By means of the device of FIGS. 3 and 4, it is provided to detect a back side attack by monitoring the value of resistance R of each of the paths connecting two adjacent pads 74 and crossing substrate 62, that is, running under a DNW region 70.

To achieve this, it is provided to apply a potential difference between two adjacent pads 74 and to measure the current flowing between these two pads, which is an image of the resistance of the above-defined path.

In the shown example, one pad 74 out of two is biased to a non-zero voltage, the other pads 74 being biased to a reference voltage, for example, the ground. Thus, in the example of FIGS. 3 and 4, a first pad 74 receives a reference voltage, a second pad receives a non-zero voltage Vsense1, a third pad receives the reference voltage, a fourth pad receives a non-zero voltage Vsense2, etc. In practice, voltages Vsense1, Vsense2, Vsense3 may have the same value.

Due to the application of a potential difference between two neighboring pads 74, a current flows between pads 74. In practice, this current flows from a pad 74 biased to a non-zero voltage, through underlying P+ region 72 and PW region 68 of this pad, through substrate 62 along DNW region 70, and under said region, and then into PW region 68 and P+ region 72 located under pad 74 biased to the reference voltage.

For the device to properly operate, maximum bias voltages Vsense1, Vsense2, Vsense3 applied on pads 74 smaller than the threshold voltage of the PN junction between region 68 and active area 66 and to the threshold voltage of the PN junction between substrate 62 and regions 70 are provided. In practice, voltages Vsense1, Vsense2, Vsense3 ranging between 0.3 and 0.6 V may be provided.

As an example of numerical applications, the space between active areas 66, and thus between DNW wells 70, may range between 0.8 and 1.2 µm, for example, 1 µm. The width of each active area 66, at the surface of the substrate, and thus of buried DNW wells 70, may be between 80 and 120 µm, for example, 100 µm. The depth of active NW areas 66 and of P-type doped PW areas 68 may be between 0.8 and 1.2 µm, for example, 1 µm, and the depth of DNW areas 70 may be between 1.6 and 2.4 µm, for example, 2 µm.

As illustrated in further detail in FIG. 4, to apply the biasings to regions 72, in practice, a ground line 76 may be formed in a metallization level of an interconnection stack formed on the circuit, above the strips forming regions 68/72. The ground line is connected to regions 72 via through vias 78. Voltages Vsense1, Vsense2, and Vsense3 may be applied to the corresponding regions 72 at each end of a strip 72.

When no attack is going on, the resistance between two adjacent pads of application of a potential difference is the sum of the following resistances:

- the resistance of regions 72, which may be considered as negligible, given the heavy doping of this area with respect to the doping of substrate 62;
- the resistance of P-type doped region (PW) 68, expressed as: $\rho_{PW} \cdot e_{PW}/L_{PW} \cdot W_{PW}$, $\rho_{PW}$ being the resistivity of region 68, $e_{PW}$ being the depth of region 68 (ranging between 0.8 and 1.2 µm, for example, equal to 1 µm) and $L_{PW}$ and $W_{PW}$ being the dimensions of this region at the surface of the device of FIG. 4 (width ranging between 0.8 and 1.2 µm, for example, equal to 1 µm, and length ranging between 0.5 and 1.5 mm, for example, equal to 1 mm). In practice, this resistance is on the order of a few ohms and appears to be negligible;
- the resistance of a strip in semiconductor substrate 62 which goes round DNW area 70 and which connects the two regions of application of voltage Vsense2 and of the reference voltage.

This resistance has, as a first approximation, the following value: $\rho_{62} \cdot e_{62}/L_{62} \cdot W_{62}$, $\rho_{62}$ being the resistivity of substrate 62, $e_{62}$ being the distance between the two PW regions 68 when going round region 70, which may be approximated to the width of active areas 66 (ranging between 80 and 120 µm, for example, equal to 100 µm), and $L_{62}$ and $W_{62}$ being the dimensions of the section of a strip going round region 70, which may be approximated, in the case of FIG. 3 where substrate 62 is epitaxial on a support 64, as the area of a strip under DNW regions 70 (width ranging between 0.8 and 1.2 µm, for example, equal to 1 µm, corresponding to the thickness of substrate 62 under DNW regions 70, and length ranging between 0.5 and 1.5 mm, for example, equal to 1 mm). It should be noted that, in the case where substrate 62 is a solid substrate, the calculation of this last resistance is more complex. In all cases, it is here attempted to detect a variation of the resistance of the path going round each DNW region 70, whatever the initial variation of resistance R (a previous measurement of resistance R before the attack may be provided).

In practice, with the dimensions provided hereabove, a resistance R between the points of application of voltage Vsense and the ground on the order of 10 kΩ may be provided. Further, in the case of FIG. 4 where the device comprises an alternation of many active NW areas 66 and of many insulating PW regions 68, two resistors with resistances calculated as hereabove are placed in parallel due to the two points of application of the reference voltage on either side of a pad of application of a voltage Vsense. Thus, the resistance between a terminal at a voltage Vsense and the ground has a total value on the order of 5 kΩ.

When an attack is carried out on the back side of the device, a portion of support 64 and of substrate 62 is removed by etching, and the resistance on at least one portion of the above electric paths increases.

Figure 5:
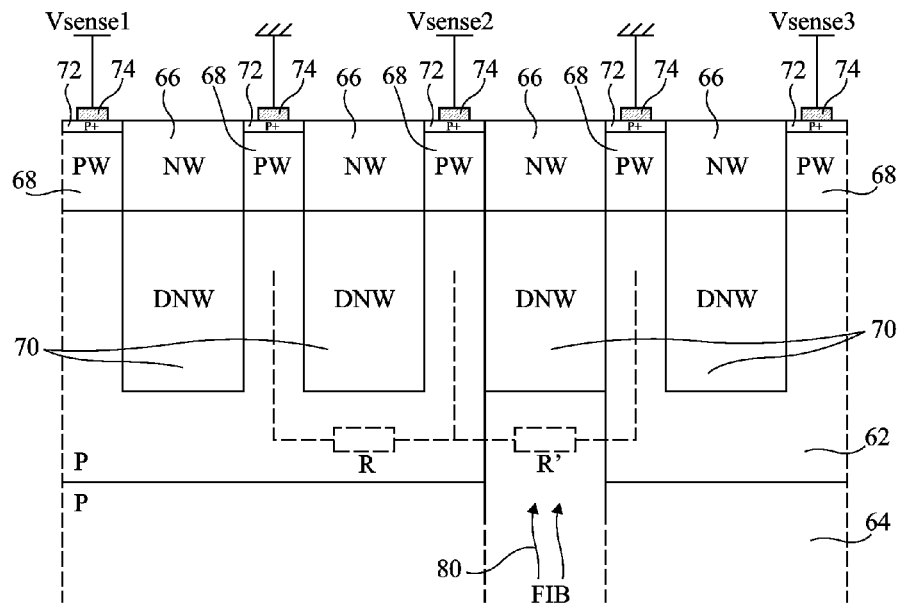
FIG. 5 is a cross-section view of the circuit of FIGS. 3 and 4 when a back side attack is performed.

FIG. 5 is a cross-section view illustrating a heavy ion beam (FIB) attack on a circuit according to an embodiment.

Such an attack is carried out on a local surface of the back side of the integrated circuit, and the decrease of the thickness of support 64 and of substrate 62 from the back side is generally performed on across widths the order of some hundred micrometers, which dimensions can be easily detected by the device provided herein. In this type of attack, at least a portion of support 64 and of substrate 62 is removed.

Further, the steps of etching by heavy ion bombarding are generally provided to stop on an interface between two doped region of different conductivity types, or on an insulating region. In the case of the structure provided herein, the FIB-type attack will probably stop at the interface between substrate 62 and a DNW well 70. This strategy is adopted since it enables to remove matter from the rear surface all the way to doped buried regions close to the surface of the semiconductor layer where the electronic components are formed, which limits the depth of the last wells of access to the different signals of the integrated circuit.

When an attack is carried out on the back side, a trench 80 is formed in support 64 and substrate 62, which causes a variation of resistance R' of the above-defined path. This thus modifies the value of the current which flows in this path, such a variation being detectable.

Indeed, if it is considered that an attack is carried out on the center of an active area NW 68, and that this attack forms a trench 80 having a 100-µm side length, with the above numerical applications, a resistance between a terminal of application of a voltage Vsense and the ground on the order of 11.1 kΩ, that is, a total resistance, due to the two resistances in parallel, on the order of 5.55 kΩ (that is, another variation of the value of the initial resistance on the order of 5%), is obtained.

It should be noted that the variation of the dimensions and of the resistivities of the different regions of the path having its resistance measured may somewhat modulate this percentage, and the value of the initial resistance of the device.

Figure 6:
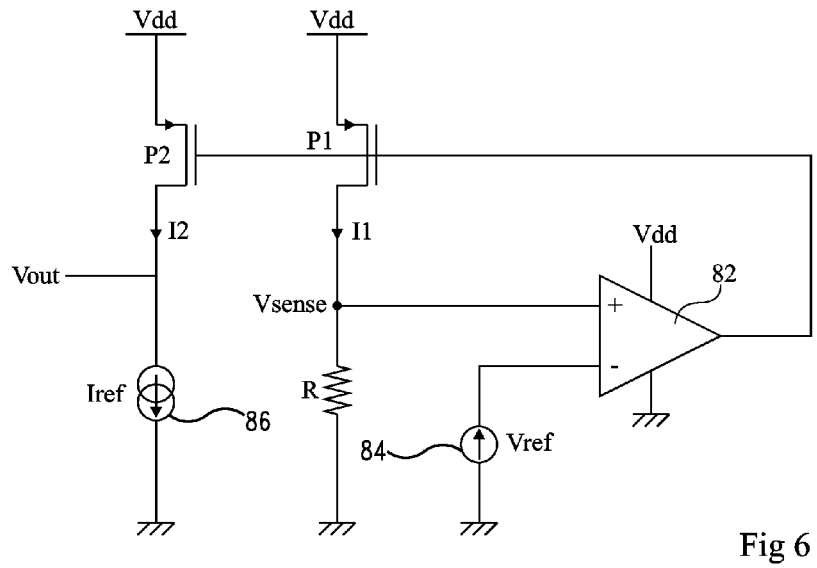
FIG. 6 illustrates an electronic circuit for detecting an attack associated with the device of FIGS. 3 and 4.

FIG. 6 illustrates a circuit for detecting an attack according to an embodiment.

Between two terminals of application of a reference voltage, for example, a terminal at a non-zero voltage Vdd and the ground, are placed a first P-type MOS transistor, P1, in series with a resistor R which corresponds to the resistance of the path in the above-defined integrated circuit. The junction point of MOS transistor P1 and of resistor R is at voltage Vsense. This junction point is connected to a non-inverting input of an operational amplifier 82, powered with power supply voltage Vdd. The inverting terminal of the operational amplifier is grounded via a source 84 of a reference voltage Vref.

The output of operational amplifier 82 is connected to the gate of first transistor P1, and also to the gate of a second transistor P2. Between the two terminals of application of voltage Vdd are placed transistor P2 and a source 86 of a current having a value Iref. The output of the comparison circuit, Vout, is connected to the junction point of current source 86 and of second transistor P2. Voltage Vref and current Iref are selected to ensure the operation described hereinafter.

Voltage Vref may be selected to be slightly lower than the threshold voltage of conventional PN junctions, that is, slightly greater than 0.6 V. In normal operation, that is, with no back side attack, operational amplifier 82 and transistor P1 impose a voltage Vsense equal to Vref. Current I1 in the branch comprising resistor R is equal to a value Vsense/R, greater than Iref. Due to the current mirror between transistors P1 and P2, current I2 in transistor P2 is equal to I1, greater than current Iref. Voltage Vout then is in a high state (Vdd).

When the resistance in the path defined hereabove switches to R', which is greater than R, that is, when an attack is carried out on the circuit, current I1 in the branch comprising this resistor decreases and switches to a value smaller than Iref. Due to the current mirror between transistors P1 and P2, current I2 in transistor P2 is equal to I1, which is smaller than Iref. Voltage Vout then is in a low state.

Thus, by properly specifying current Iref, resistance variations in the branch comprising resistor R may be detected.

It should be noted that any type of circuit enabling to measure a resistance by measuring the current flowing therethrough may be used instead of the circuit of FIG. 6 to detect a focused heavy ion beam attack (FIB) on the device of FIGS. 3 and 4.

If an attack is detected by means of the above device, the integrated circuit may comprise a device which controls the stopping of the integrated circuit, or again the deleting of confidential data. Advantageously, the structure provided herein is compatible with structures of detection of other types of back side attacks, for example, of latch-up detection, or anti-noise devices.

Further, this device provides the advantage of an attack detection as soon as said attack has begun, since resistance R varies as soon as the back side structure of the device is altered. It also enables to detect an attack at any location of the rear surface of the integrated circuit if the structure provided herein is deployed over all the active areas.

Specific embodiments of the present disclosure have been described. Various alterations, modifications, and improvements will occur to those skilled in the art. In particular, it may be provided to connect one pad 74 out of two to a non-zero voltage, instead of connecting it to ground.

The numerical applications given herein, be it for the dimensions of the different regions or for their resistivities, are also provided as a non-limiting example.

It should also be noted that the principle of a measurement of the substrate resistance under a DNW region 70 also applies to a device in which a single active NW area 66 (and thus a single region 70) is provided in the substrate, if a back side attack is desired to be detected at the level of this active area only.

Further, it should be noted that all the conductivity types of the different regions of the device of FIGS. 3 and 4 may be inverted with respect to what has been described, as long as the junction between the path of resistance R and regions 70 remains blocking.

Further, various embodiments with different variations have been described hereinabove. It should be noted that those skilled in the art may combine various elements of these various embodiments and variations without showing any inventive step.

Such alterations, modifications, and improvements are intended to be part of this disclosure. Accordingly, the foregoing description is by way of example only and is not intended to be limiting disclosure The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit comprising:
a semiconductor substrate of a first conductivity type having a surface;
a first well of a second conductivity type formed in the substrate and having first and second sides;
first and second regions of the first conductivity type defined at the surface of the substrate and respectively delimiting the first and second sides of the first well;
a region of the second conductivity type which extends in the semiconductor substrate under said first well; and
a detector configured to detect a variation of a resistance of the substrate between the first and second regions of the first conductivity type.

2. The circuit of claim 1, wherein the detector comprises:
a voltage generator circuit configured to generate a first potential difference between said first and second regions and cause a current to flow between said first and second regions; and
a comparison circuit configured to compare the current between said first and second regions and a threshold.

3. The circuit of claim 2, comprising:
a second well of the second conductivity type formed in the substrate and having first and second sides;
a third region of the first conductivity type, the second and third regions respectively delimiting the first and second sides of the second well, and the voltage generator circuit being configured to apply a second potential difference between the second region and the third region.

4. The circuit of claim 3, wherein the first potential difference and the second potential difference are equal.

5. The circuit of claim 2, wherein the comparison circuit comprises:
first and second power supply terminals;
a first branch that includes a first transistor in series with the resistance of the substrate between the first and second regions;
a second branch that includes a second transistor and a reference current generator in series with each other; and an operational amplifier having a first input terminal electrically coupled to a junction point between the first transistor and the resistance of the substrate between the first and second regions, a second input terminal electrically coupled to a reference voltage generator, and an output configured to control the first and second transistors.

6. The circuit of claim 1, further comprising first and second heavily-doped areas of the first conductivity type formed at respective surfaces of the first and second regions.

7. The circuit of claim 1, further comprising a protection circuit coupled to the detector and configured to protect the integrated circuit if a variation of the resistance of the substrate between two strongly resistive regions is detected.

8. The circuit of claim 1, wherein the first conductivity type is type P and the second conductivity type is type N.

9. The circuit of claim 1, wherein the semiconductor substrate is a solid substrate.

10. The circuit of claim 1, wherein the semiconductor substrate includes a layer of an epitaxial semiconductor material on a semiconductor support.

11. A method of making an integrated circuit comprising:
forming, in a semiconductor substrate of a first conductivity type, a first well of a second conductivity type and having first and second sides;
forming first and second regions of the first conductivity type at a surface of the substrate and respectively delimiting the first and second sides of the first well;
forming a region of the second conductivity type which extends in the semiconductor substrate under said first well; and
forming in the substrate a detector configured to detect a variation of a resistance of the substrate between the first and second regions of the first conductivity type.

12. The method of claim 11, wherein forming the detector comprises:

forming a voltage generator circuit configured to generate a first potential difference between said first and second regions and cause a current to flow between said first and second regions; and
forming a comparison circuit configured to compare the current between said first and second regions and a threshold.

13. The method of claim 12, comprising:
forming a second well of the second conductivity type formed in the substrate and having first and second sides;
forming a third region of the first conductivity type, the second and third regions respectively delimiting the first and second sides of the second well, and the voltage generator circuit being configured to apply a second potential difference between the second region and the third region.

14. The method of claim 12, wherein forming the comparison circuit comprises:
forming first and second power supply terminals;
forming a first branch that includes a first transistor in series with the resistance of the substrate between the first and second regions;
forming a second branch that includes a second transistor and a reference current generator in series with each other; and
forming an operational amplifier having a first input terminal electrically coupled to a junction point between the first transistor and the resistance of the substrate between the first and second regions, a second input terminal electrically coupled to a reference voltage generator, and an output configured to control the first and second transistors.

15. The method of claim 11, further comprising forming first and second heavily-doped areas of the first conductivity type formed at respective surfaces of the first and second regions.

* * * * *